(12) United States Patent
Frank et al.

(10) Patent No.: US 8,148,857 B2
(45) Date of Patent: Apr. 3, 2012

(54) COOLING SYSTEM OF A SUPERCONDUCTING MACHINE

(75) Inventors: Michael Frank, Uttenreuth (DE); Peter van Haβelt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 159 days.

(21) Appl. No.: 12/450,839

(22) PCT Filed: Apr. 11, 2008

(86) PCT No.: PCT/EP2008/054430
§ 371 (c)(1),
(2), (4) Date: Oct. 15, 2009

(87) PCT Pub. No.: WO2008/125632
PCT Pub. Date: Oct. 23, 2008

(65) Prior Publication Data
US 2010/0038980 A1 Feb. 18, 2010

(30) Foreign Application Priority Data
Apr. 16, 2007 (DE) .......................... 10 2007 017 795

(51) Int. Cl.
*H02K 9/00* (2006.01)

(52) U.S. Cl. ............................................ 310/52; 310/54
(58) Field of Classification Search .................... 310/52, 310/54, 64
See application file for complete search history.

(56) References Cited

U.S. PATENT DOCUMENTS

| 3,223,075 | A | 12/1965 | Barlow |
|---|---|---|---|
| 4,553,505 | A | 11/1985 | Hirano et al. |
| 2004/0056541 | A1* | 3/2004 | Steinmeyer ..................... 310/52 |
| 2007/0095075 | A1* | 5/2007 | Frank ............................ 62/48.2 |

FOREIGN PATENT DOCUMENTS

DE 103 21 463 12/2004

OTHER PUBLICATIONS

An English language abstract of WIPO Publication No. WO 2004/102779.

* cited by examiner

*Primary Examiner* — Nguyen N Hanh
(74) *Attorney, Agent, or Firm* — Harness, Dickey & Pierce, P.L.C.

(57) ABSTRACT

A superconducting machine device is disclosed including a machine; a rotor including a superconductive coil; and a cooling system including at least one incline-intolerant component for cooling the coil. In at least one embodiment, at least one component is held by a carrier compensating for an incline of the machine device.

13 Claims, 2 Drawing Sheets

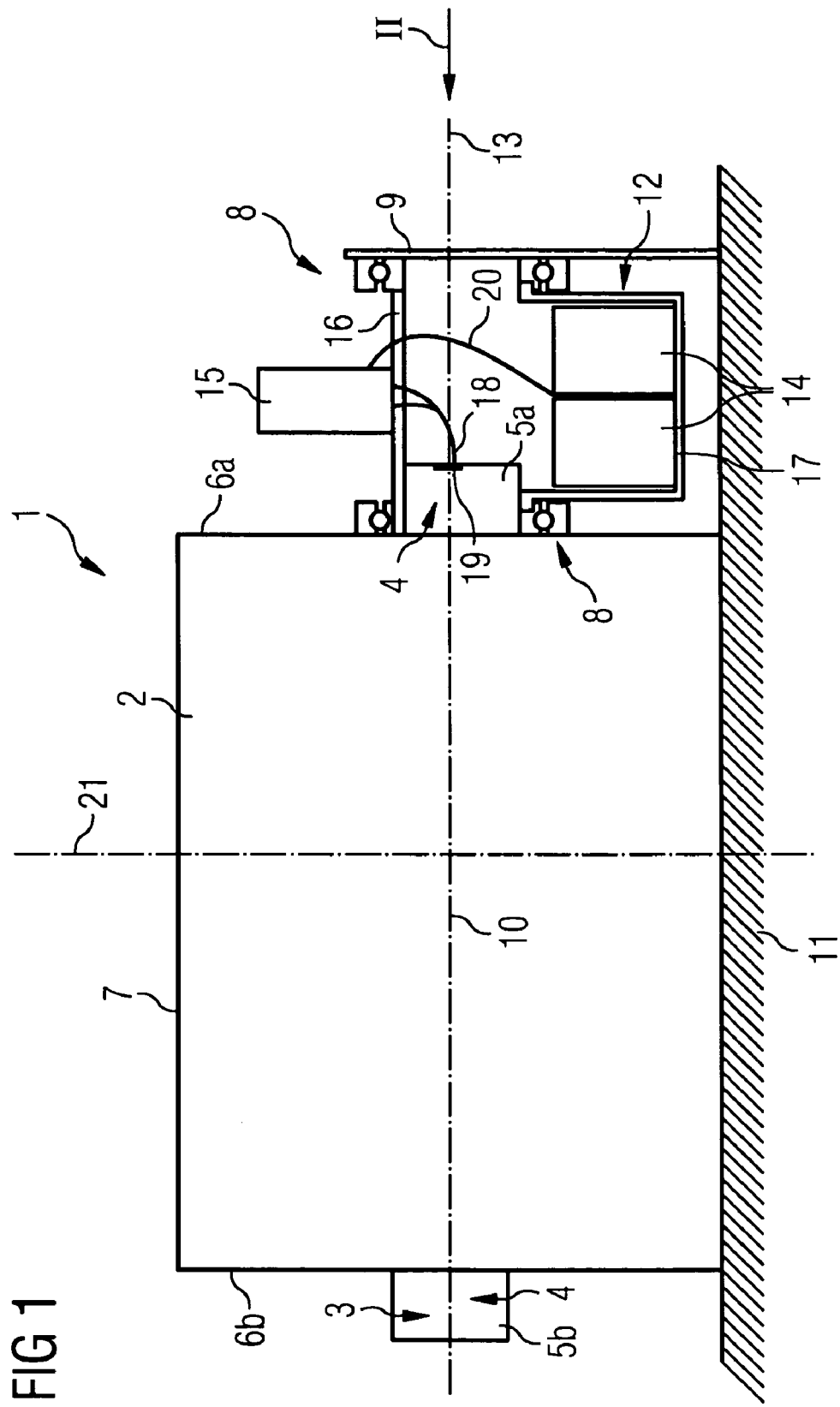

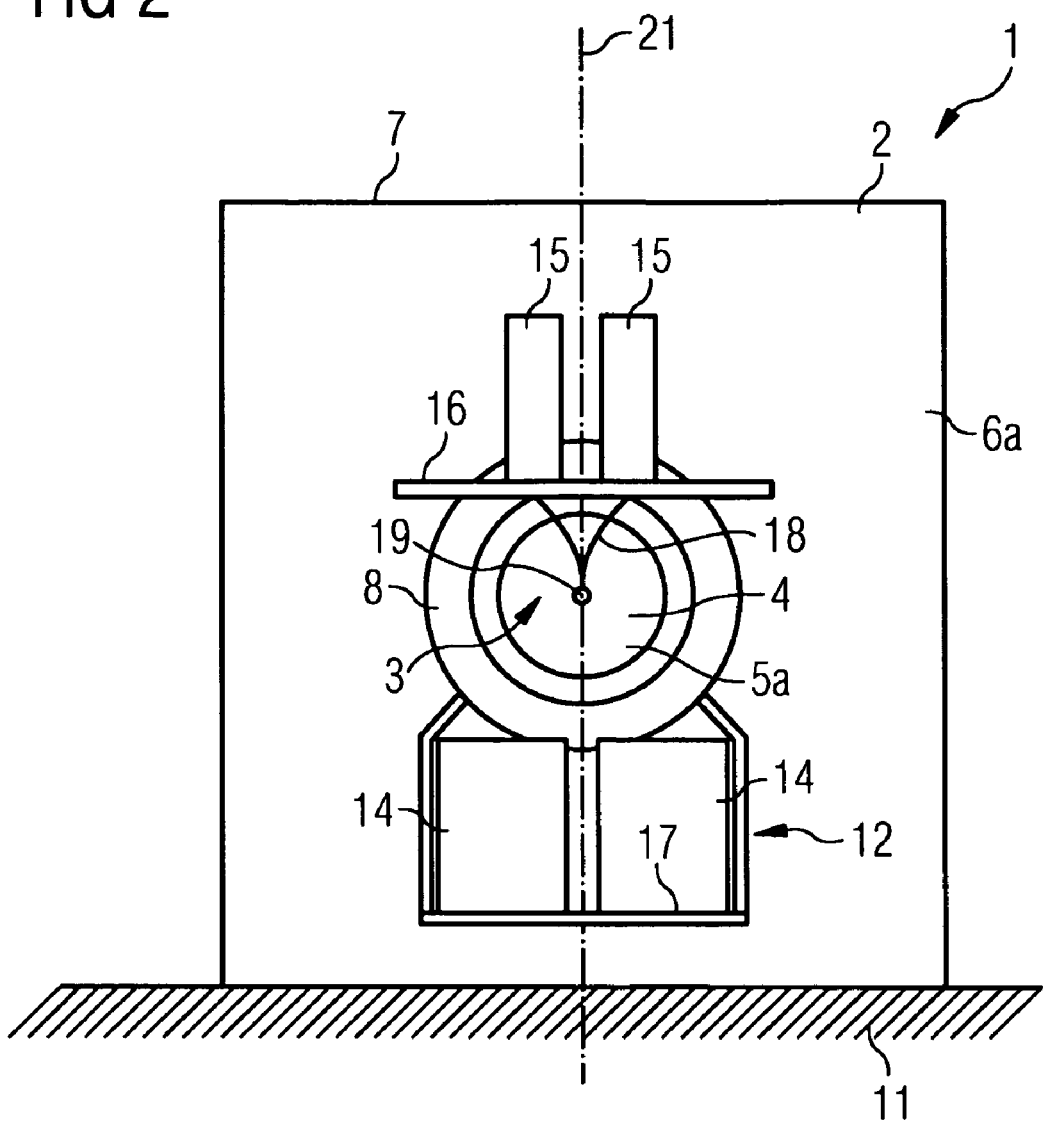

COOLING SYSTEM OF A SUPERCONDUCTING MACHINE

PRIORITY STATEMENT

This application is the national phase under 35 U.S.C. §371 of PCT International Application No. PCT/EP2008/054430 which has an International filing date of Apr. 11, 2008, which designated the United States of America, and which claims priority on German patent application number DE 10 2007 017 795.1 filed Apr. 16, 2007, the entire contents of each of which are hereby incorporated herein by reference.

FIELD

At least one embodiment of the invention generally relates to a machine device which comprises a machine having a superconducting rotor winding and a cooling system for cooling the rotor winding and the rotor.

BACKGROUND

Cooling systems for a device, which is known by way of example from DE 100 57 664 A1, DE 103 21 463 A1 and DE 100 39 964 A1, frequently have inclination-intolerant components, which is problematic for use on marine vessels or offshore platforms. In the case of oil-lubricated compressors, for example, it is necessary for a suction area of the lubrication circuit to always be arranged within an oil supply or oil sump. At extreme inclination orientations, there is therefore a danger of the lubrication being interrupted at times, with the negative consequences which result from this. Furthermore, there is a risk of the compressed working gas being contaminated with oil, since oil separators and adsorbers are designed for vertical operation.

The superconducting winding is frequently cooled by cooling circuits which are operated by the force of gravity and are based on the thermosiphon effect. For cooling, an axially extending cavity is provided in the rotor and is fed with a coolant, for example with liquid neon. For this purpose, a coaxially positioned connection is provided at an end of the rotor shaft which projects out of the machine, to which connection a condenser is connected via one or two lines, which condenser is located at a geodetically higher position than the cavity in the rotor, and in which the coolant is liquefied. Because the density of the coolant is then greater, it flows back into the rotor where it absorbs heat that is emitted from the winding, is vaporized in the process, and is transported to the condenser, where it is liquefied again. When machine devices with cooling circuits such as these are now used on the marine vessels or offshore platforms, the cooling circuit which is operated by the force of gravity can be disrupted, as a result of which reliable winding cooling can no longer be ensured.

SUMMARY

At least one embodiment of the invention is directed to a machine device, which comprises a machine and an associated cooling system, initially suitable for ensuring the functionality of inclination-intolerant components of the cooling system, and therefore to ensure reliable cooling of the superconducting rotor winding, even in inclined orientations.

In at least one embodiment, at least one inclination-intolerant component of the cooling system is held by a mount which compensates for any inclination of the machine device. Suitable measures therefore result in the mount, which, for example, has a platform for holding a component of the cooling system, being held in a position in which the components operate reliably and without any disturbances, independently of the inclination of the machine. For example, the mount can be stabilized with the aid of actuators and appropriate control elements.

In one example embodiment variant, which requires relatively little technical complexity, the mount is operated by the force of gravity. This can be accomplished, for example, by suspending it on cables or chains. However, a refinement such as this is suitable only to a limited extent, in particular for use on marine vessels.

An example refinement of operation by the force of gravity therefore provides for the mount to be mounted such it can pivot about at least one rotation axis which runs transversely with respect to a vertical axis of the device, wherein the center of gravity of the mount is located below the rotation axis. The pivoting movement of the mount takes place in a single direction, which is predetermined by the rotation axis. Furthermore, the pivoting mounting can be designed such that the rotation axis is oriented in a defined manner with respect to the machine.

In many cases, particularly when using a machine device on marine vessels, it is sufficient for the mount to be able to pivot about a single rotation axis which extends in the longitudinal direction of the marine vessel. This is because, in a heavy sea state, the movement of a marine vessel is mainly problematic about its longitudinal axis (rolling), while the movement about the lateral axis (pitching) is less problematic.

In applications in which one predetermined pivoting direction on its own is not sufficient, it may be expedient to provide a second rotation axis, which extends approximately transversely with respect to the first rotation axis.

In the situation in which the center of gravity of the mount which is fitted with components of the cooling system is above rotation axis, a stabilizing movement of the center of gravity is provided in one example refinement with the aid of a counterweight, in which case a component of the cooling system, in particular one or more compressors, is or are used as a counterweight in a particularly expedient manner.

In a further example refinement, the rotation axis of the mount is aligned with the rotation axis of the rotor. The connection which is provided at the end of the rotor shaft and is used for connection of the cooling system therefore does not carry out any transverse movement with respect to the rotation axis of the mount, and with respect to a cooling-system line which is connected to the connection. The line is therefore not subjected to any bending load, which would shorten its life. A bending load on lines is also prevented by arranging all of the components which are connected to one another via lines on the mount.

By way of example, the mount can be mounted such that it can pivot by way of a rigid shaft or a shaft which can rotate. However, it is preferably mounted on a circular guide. A guide such as this, for example a guide in this form of a ball bearing or roller bearing, can easily be fixed to a machine housing wall through which the rotor shaft passes, to be precise coaxially with respect to the rotor shaft. This is done such that its rotation axis is aligned with the rotation axis of the mount.

BRIEF DESCRIPTION OF THE DRAWINGS

The invention will now be explained in more detail with reference to the attached drawings, in which:

FIG. 1 shows a schematic side view of a machine device, and

FIG. 2 shows a plan view in the direction of the arrow II in FIG. 1.

DETAILED DESCRIPTION OF THE EXAMPLE EMBODIMENTS

The machine device 1 shown in the figures comprises a machine 2 and a cooling system. By way of example, the machine is a synchronous motor or a generator having a rotor 3 which has a superconducting winding, of which only the rotor shaft 4 and its end section 5a, 5b which projects out of end walls 6a, 6b of the machine housing 7 can be seen in the figures. The basic design of a machine having a superconducting winding is known from the documents cited initially, to which reference is explicitly made here.

A circular guide 8 is arranged on the end wall 6a, and is formed, for example, by a ball bearing or roller bearing. A second guide 8 is fixed to a frame 9 which is positioned at a distance from the end wall 6a, and this guide 8 can likewise be in the form of a roller bearing or ball bearing. The guides 8 are arranged coaxially with respect to the rotation axis 10 of the rotor 3, and are used for bearing a mount 12. Because the guides 8 are arranged coaxially with respect to the rotation axis 10 of the rotor 3, the mount 12 can pivot about a rotation axis 13 which is aligned with the rotation axis 10. Both rotation axes 10, 13 extend transversely with respect to a vertical axis 21 of the machine 2.

The cooling system held in a fixed position on the mount and comprises, inter alia, two compressors 14, for example, and two cold heads 15, for example. The latter are positioned above the rotation axis 13, and the former are positioned below it. Said components of the cooling system are held in a fixed position on the mount 12 and stand on approximately horizontally extending platforms 16, 17. The compressors 14 have a greater mass than the cold heads 15, as a result of which the center of gravity of the mount 12, including the components arranged on it, is under the rotation axis 13.

The mount 12 is accordingly held by the force of gravity in a position in which the platforms 16, 17 are aligned essentially horizontally when the base 11 on which the machine 2 is mounted, for example the bottom of the marine vessel, is tilted, thus precluding problems of the type described above.

The cold heads 15 are connected via a line 18 to a connection 19 which is arranged coaxially with respect to the rotation axis 10 of the rotor 3, at the end, on the longitudinal section 5a of the rotor shaft 5. A coolant, for example neon, is passed into the cavity in the rotor 3 via the line 18 and the connection 19, from condensers (not shown) which are provided on the cold heads 15, as described in more detail in the documents cited above. In the rotor 3, the coolant absorbs the heat emitted from the rotor winding, and is thus vaporized. It is then passed via the same line 18 back again to the cold head 15, where it is once again liquefied. The cold heads 15 are each connected to the compressors 14 via a pair of pressure lines 20. A second coolant, normally helium, is compressed in the compressors 14, and is passed to the cold heads 15.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A superconducting machine device, comprising:
   a machine;
   a rotor including a superconducting winding;
   a cooling system, including at least one inclination-intolerant component, for cooling of the superconducting winding, wherein the at least one inclination-intolerant component is held by a mount which compensates for any inclination of the superconducting machine device; and
   a mount, operated by a force of gravity.

2. The machine device as claimed in claim 1, wherein the mount is pivotable about at least one rotation axis which runs transversely with respect to a vertical axis of the machine, wherein the center of gravity of the mount is located at a position below its rotation axis.

3. The machine device as claimed in claim 2, wherein the position of the center of gravity is achieved by a counterweight, arranged on the mount.

4. The machine device as claimed in claim 3, wherein a cooling-system component, positioned on the mount, is used as the counterweight.

5. The machine device as claimed in claim 4, wherein the mount is mounted on at least one circular guide.

6. The machine device as claimed in claim 4, wherein a rotation axis of the mount is aligned with a rotation axis of the rotor.

7. The machine device as claimed in claim 4, wherein all of the components which are connected to one another via lines are arranged on the mount.

8. The machine device as claimed in claim 3, wherein the mount is mounted on at least one circular guide.

9. The machine device as claimed in claim 3, wherein a rotation axis of the mount is aligned with a rotation axis of the rotor.

10. The machine device as claimed in claim 3, wherein all of the components which are connected to one another via lines are arranged on the mount.

11. The machine device as claimed in claim 2, wherein the mount is mounted on at least one circular guide.

12. The machine device as claimed in claim 1, wherein a rotation axis of the mount is aligned with a rotation axis of the rotor.

13. The machine device as claimed in claim 1, wherein all of the components which are connected to one another via lines are arranged on the mount.

* * * * *